US012536943B2

(12) United States Patent
Sato

(10) Patent No.: US 12,536,943 B2
(45) Date of Patent: Jan. 27, 2026

(54) DISPLAY PANEL AND OPERATION DISPLAY PANEL

(71) Applicant: mui Lab, Inc., Kyoto (JP)

(72) Inventor: Munehiko Sato, Kyoto (JP)

(73) Assignee: MUI LAB, INC., Kyoto (JP)

( * ) Notice: Subject to any disclaimer, the term of this patent is extended or adjusted under 35 U.S.C. 154(b) by 499 days.

(21) Appl. No.: 18/013,792

(22) PCT Filed: Jul. 20, 2021

(86) PCT No.: PCT/JP2021/027103
§ 371 (c)(1),
(2) Date: Dec. 29, 2022

(87) PCT Pub. No.: WO2022/070564
PCT Pub. Date: Apr. 7, 2022

(65) Prior Publication Data
US 2023/0290293 A1    Sep. 14, 2023

(30) Foreign Application Priority Data

Sep. 29, 2020  (JP) .................................. 2020-164195

(51) Int. Cl.
*G09G 3/20* (2006.01)
*G02B 5/28* (2006.01)
(Continued)

(52) U.S. Cl.
CPC ............ *G09G 3/2092* (2013.01); *G02B 5/28* (2013.01); *G02B 27/0093* (2013.01);
(Continued)

(58) Field of Classification Search
CPC .. G09G 3/2092; G09G 3/2003; G09G 3/3473; G09G 2354/00; H10H 29/142;
(Continued)

(56) References Cited

U.S. PATENT DOCUMENTS

2003/0042493 A1    3/2003  Kazakevich
2016/0062114 A1*   3/2016  Amarilio ............ G02B 27/0081
                                                              359/613
(Continued)

FOREIGN PATENT DOCUMENTS

CN        106917968        7/2017
WO        2016/104616      6/2016

OTHER PUBLICATIONS

"International Search Report", PCT/JP2021/027103, mailed Sep. 28, 2021.

*Primary Examiner* — Mary Ellen Bowman
(74) *Attorney, Agent, or Firm* — Ogilvie Law Firm

(57) ABSTRACT

Provided are a display panel and an operation display panel which improve visibility when emitting light in order to cope even with a higher-definition display while reducing the thickness of a device and which can be manufactured at low cost. The present invention comprises: a light emitting element array substrate in which light emitting elements containing no fluorescent body are two-dimensionally arranged; a fluorescent sheet or fluorescent resin base material laminated on the light emitting element array substrate; a light guide path-forming base material that is laminated on the fluorescent sheet or fluorescent resin base material and forms a light guide path in an optical axis direction of the light emitting element; and an opaque thin layer that covers an exit surface side of the light guide path-forming base material.

20 Claims, 7 Drawing Sheets

(51) Int. Cl.
G02B 27/00 (2006.01)
G09G 3/34 (2006.01)
H10H 20/854 (2025.01)
H10H 29/14 (2025.01)

(52) U.S. Cl.
CPC ......... *G09G 3/2003* (2013.01); *G09G 3/3473* (2013.01); *H10H 20/854* (2025.01); *H10H 29/142* (2025.01); *G02B 2207/123* (2013.01); *G09G 2354/00* (2013.01)

(58) Field of Classification Search
CPC .... H10H 20/854; G02B 5/28; G02B 27/0093; G02B 2207/123
See application file for complete search history.

(56) References Cited

U.S. PATENT DOCUMENTS

2017/0090247 A1* 3/2017 Lee ................... G02F 1/133512
2020/0241675 A1* 7/2020 Oki ...................... G02B 6/0088

* cited by examiner

DISPLAY PANEL AND OPERATION DISPLAY PANEL

RELATED APPLICATIONS

The present application claims priority to, and incorporates by reference the entirety of, PCT application no. PCT/JP2021/027103 filed 21 Jul. 2021, and Japanese patent application no. 2020-164195 filed 29 Sep. 2020.

TECHNICAL FIELD

The present invention relates to an operation display device mounted on a controller of a home appliance, a display of an electronic device, or a movable body such as an automobile.

BACKGROUND ART

In recent years, information communication technology has undergone remarkable progress. In the past, personal computers were used only in limited spaces such as homes and offices, but with the spread of smartphones and tablet terminals, today, it has become possible for anyone to live a highly convenient life using the Internet and so on. Also, from the viewpoint of the Internet of Things (IoT), new products using the Internet are being developed one after another for home appliances and the like that had not been conventionally connected to the Internet. Thus, the Internet and products using the Internet have already become indispensable to people's lives, and they are installed or carried everywhere and used by many people.

However, while people can enjoy a very convenient life by having all kinds of electronic devices existing around them, there are many people who feel stressed about living surrounded by electronic devices.

For example, a hotel that treasures the warmth of natural trees can be said to be providing a high-quality space where guests can relax and forget their work etc. However, if there are a large number of electronic devices, displays or controllers having inorganic forms in such guest rooms, it will not be possible for guests to forget daily life and relax sufficiently.

Therefore, there is known an operation display panel-incorporated article, disposed on the outer peripheral surface of the housing, in which a thin layer made of wood or the like covers the entire front surface of the display panel with a touch sensor incorporated in the outer peripheral surface of the housing. (See Patent Document 1). This is because the thickness of the thin layer and the brightness of the panel are designed so that the content displayed on the panel is visible. According to such technology, even an article incorporating an operation display panel naturally blends in with the space and does not become a visual noise for the user, and when the user wants to use it or needs it, it is possible to intuitively operate it while feeling the touch of the natural material.

In the operation display panel incorporated article of Patent Document 1, a light guide for guiding the light emission direction of the light emitting elements is provided between the transparent conductive sheet and the light emitting element array in order to improve visibility during display. The light guide here is an opaque dark-colored base material laminated on the substrate of the light emitting element array, enclosing the entire light emitting element array, and provided with through holes along the optical axis of each light emitting element. By providing through holes along the optical axis of each light emitting element in this manner, it is assumed that the visibility during light emission can be improved.

However, in the structure in which the thin layer is provided on the front surface of the display panel, there is still a need to further improve visibility during light emission.

Also, in the structure in which the thin layer is provided on the front surface of the display panel, a certain thickness is required for the device, but there is also a need to make the device thinner and to manufacture it at a lower cost. In other words, with respect to thinning, the light guide shown in Patent Document 1 requires a hole-making process during fabrication, but when the display becomes high-definition, it becomes difficult in terms of process and strength to make a small hole.

PRIOR ART

Patent Document

[Patent Document 1] JP 6370519 B

OUTLINE OF THE INVENTION

Problems to be Solved by the Invention

In view of such a situation, it is an object of the present invention to provide a display panel and an operation display panel which improves visibility when emitting light in order to cope even with a higher-definition display while reducing the thickness of a device and which can be manufactured at low cost.

Means to Solve the Objects

In order to solve the above problems, a display panel of a first aspect of the present invention comprises a light emitting element array substrate in which light emitting elements containing no fluorescent body are two-dimensionally arranged, a fluorescent sheet or fluorescent resin base material laminated on the light emitting element array substrate, a light guide path-forming base material that is laminated on the fluorescent sheet or fluorescent resin base material and forms a light guide path in an optical axis direction of the light emitting element, and an opaque thin layer that covers an exit surface side of the light guide path-forming base material.

By using light emitting elements that contain no fluorescent body as the light emitting elements that are two-dimensionally arranged on the light emitting element array substrate, since there is no need to mold the fluorescent resin onto the light emitting element, the size of the light emitting element can be reduced, contributing to improved productivity and reduced thinning.

By providing the fluorescent sheet with a small thickness, scattering of light within the fluorescent sheet is suppressed, and blurring of light displayed on the surface material is reduced. Although it depends on the degree of diffusion of light within the fluorescent sheet, it is preferable that the thickness of the fluorescent sheet is less than 0.4 mm, for example, in order to reduce the blurring of light. Also, the fluorescent sheet may be formed by coating a liquid agent containing fluorescent body to the surface or the back surface of the light guide path-forming base material, or the back surface of the thin layer.

Also, the fluorescent sheet can be used in place of a base material to which the thin layer is attached by using a thicker fluorescent resin base material. In that case, it is preferable to provide an opaque mask having through-holes formed in accordance with the arrangement of the light emitting elements on the surface of the fluorescent resin base material. By providing the opaque mask on the surface of the fluorescent resin base material, diffusion of light in the fluorescent body can be prevented.

The fluorescent body constituting the fluorescent sheet or the fluorescent resin base material is not limited to a monochromatic fluorescent body, and fluorescent bodies of a plurality of colors may be used. For example, fluorescent bodies of two colors may be arranged in a checkered pattern.

Also, the fluorescent color of the fluorescent sheet or fluorescent resin base material may be complementary to the color of light emitted by the light emitting element. When two colors of light are additively mixed to produce white light, the two colors are complementary to each other, and the emission color of the light emitting element can produce white light according to the fluorescent color of the fluorescent sheet.

The exit surface side of the light guide path-forming base material, or the exit surface side of the fluorescent sheet or fluorescent resin base material, that is, the opaque thin layer covering the exit surface side of the display panel, has an effect of making the presence of the light emitting elements invisible when the display is not on, or has the effect of imparting aesthetics and a relaxing effect depending on the material used. It also has an effect as the back-projection screen that diffuses the light, which has increased directivity through the light guide path-forming base material on which the light guide path is formed, by passing it through the opaque thin layer.

A display panel of the present invention is provided with the light guide path-forming base material that forms the light guide path in the optical axis direction of the light emitting elements, so that light from the light emitting elements can efficiently propagate straight. This reduces the loss of light, increases the amount of light when displaying in the thin layer, and improves the display performance. In addition, effects such as cost reduction and miniaturization of light emitting element parts, and suppression of power consumption and heat generation can be obtained. Furthermore, miniaturization of light emitting element parts contributes to higher density of pixels.

Also, unlike conventional light guides, it is not necessary to align the light emitting element and the light guide path-forming base material, so that the manufacturing cost can be reduced. In the display panel of the first aspect of the present invention, the fluorescent sheet or the fluorescent resin base material is laminated on the light emitting element array substrate, and by light emitted from the light emitting elements of the light emitting element array substrate passing through the fluorescent sheet or the fluorescent resin base material and the light guide path-foiling base material in this order, variations in brightness and color that occur depending on the light emitting position and direction of the light emitting element can be improved and effects in terms of productivity and thickness reduction can be expected.

A display panel of a second aspect of the present invention comprises a light emitting element array substrate in which light emitting elements containing no fluorescent body are two-dimensionally arranged, a light guide path-forming base material that is laminated on the light emitting element array substrate and forms a light guide path in an optical axis direction of the light emitting element, a fluorescent sheet or fluorescent resin base material laminated on the light guide path-forming base material, and an opaque thin layer that covers an exit surface side of the fluorescent sheet or fluorescent resin base material.

Light emitted from the light emitting elements of the light emitting element array substrate passes through the light guide path-forming base material, the fluorescent sheet, or the fluorescent resin base material in that order, so that the light from the light emitting elements propagates straight through the light guide path-forming base material, the fluorescent sheet, etc. and can be transmitted and diffusion of light in the fluorescent sheet, etc. can be prevented.

In a display panel of the present invention, the transparent base may be laminated between the thin layer and the light guide path-forming base material or between the light guide path-forming base material and the light emitting element array substrate. The transparent base may be laminated on the back surface of the thin film, or may be laminated on the front surface (exit side) or back surface (incident side) of the light guide path-forming base material. Transparent polycarbonate (PC), transparent polyethylene terephthalate (PET), or the like can be used as the transparent base. By changing the thickness of this transparent base, it is possible to adjust the bleeding of characters and figures displayed on the thin layer.

Further, in a display panel of the present invention, a screen-like wall portion higher than the height of the light emitting elements may be provided between the light emitting elements on the light emitting element array substrate. The screen-like wall portion can be formed on the light emitting element array substrate by, for example, printing. By providing the screen-like wall portion, it is possible to prevent the light from the light emitting element from leaking in the lateral direction and lowering the display performance. In addition, the height of the screen-like wall portion can be appropriately designed according to needs, but by providing the screen-like wall portion higher, the light from the light emitting element can be guided upward more effectively. On the other hand, it is possible to reduce the thickness of the display panel by providing the screen-like wall portion lower than the height of the light emitting element.

Here, the screen-like wall portion may be formed by printing on the light emitting element array substrate. By downsizing the size of the light emitting elements from the order of millimeters to the order of microns, the printed and foiled elements on the light emitting element array substrate can function as screen-like wall portion higher than the height of the light emitting elements.

In a display panel of the present invention, the light guide path-forming base material is a resin or metal base provided with fine holes. The fine holes are preferably formed by grid-shaped louvers, and the gaps between the grid-shaped louvers serve as light guide paths along the optical axes of the light emitting elements arranged on the light emitting element array substrate. Also, the light guide path-forming base material is a resin base made of a transparent resin provided with fine holes, and the fine holes may be filled with a translucent material having a refractive index different from that of the resin base. With the above structure, the light from the light emitting element can efficiently propagate straight, and the display performance can be improved. A known privacy filter is preferably used as the light guide path-forming base material in which fine holes formed by grid-like louvers are provided in a resin or metal base, or in which fine holes provided in a resin base are filled with the translucent material.

In this specification, the shape of the fine holes is not particularly limited, and may be not only circular holes in planar view but also polygonal shapes such as hexagons in planar view.

In a display panel of the present invention, the light guide path-forming base material may be formed by laminating at least two louver films so that the louvers are perpendicular to each other. By laminating a plurality of louver films, the light from the light emitting element can be efficiently propagated straight at low cost even without using the grid-shaped louver, thereby improving the display performance.

In a display panel of the present invention, the light guide path-forming base material may be composed of an aggregate of fine fibers. By forming the light guide path-forming base material from the aggregate of fine fibers, the light from the light emitting element can be efficiently propagated straight along the optical axis, and the display performance can be improved. The fine fibers are widely available, such as optical fibers and ulexite, but are preferably glass or plastic optical fibers. In the case of the fine holes described above, light is absorbed in the holes and the amount of light reaching the surface is reduced. However, fine fibers such as optical fibers have the advantage of suppressing light absorption and increasing the amount of light reaching the surface because light is totally reflected.

In a display panel of the present invention, the light guide path-forming base material may be an aggregate of screen-like wall portions surrounding the light emitting elements of the light emitting element array substrate. Since the height of the screen-like wall portion is higher than the height of the light emitting element, the light can be guided in the optical axis direction of the light emitting element.

In a display panel of the present invention, the light guide path-forming base material may be made of flexible resin. By forming the light guide path-forming base material from the flexible resin, it is possible to manufacture display panels having various shapes.

Also, when the fluorescent sheet is flexible and the light guide path-forming base material is made of flexible resin, the light emitting element array substrate may also be made of flexible resin or be non-planar. With such a structure, the entire display panel can be bent or curved, and display panels with various designs can be manufactured.

In a display panel of the present invention, the fluorescent resin base material may be a base material formed by kneading fluorescent body into a resin. If the base material is foiled by kneading fluorescent body into the resin, it is possible to ensure a sufficient thickness and a certain degree of strength.

As described above, the opaque thin layer covering the exit surface side of the display panel has the effect of making the existence of the light-emitting elements invisible when the display is not on, and has the effect of a back-projection screen that diffuses light through the opaque thin layer, the light having high directivity through the base material on which the light guide path is formed. The effect of diffusing light with increased directivity can be used universally in higher-definition displays. Therefore, a wide range of materials such as resins, metals, and other natural materials can be used as the material of the thin layer, and the shape is not limited to a sheet shape, and it may be formed of a coating film.

Also, depending on the material used, the opaque thin layer that covers the exit surface side of the display panel has the effect of imparting aesthetics and a relaxing effect. Therefore, in a display panel of the present invention, the thin layer is preferably made of a wood derived from nature, a natural fiber, a natural leather, or a natural stone.

Alternatively, the thin layer is preferably made of a resin produced to mimic the appearance and touch of a wood derived from nature, a synthetic fiber produced to mimic the appearance and touch of a natural fiber, a synthetic leather produced to mimic the appearance and touch of a natural leather, or an artificial stone produced to mimic the appearance and touch of a natural stone.

A natural touch feeling can be realized by using a naturally-derived material or a material generated by imitating an appearance and touch of nature. Therefore, a polymer material such as a resin can also be used as the material of the thin layer as long as it realizes a natural appearance and has a natural touch feeling. Since the resin is easy to mold, there is an advantage in that a thin layer having a three-dimensionally complicated shape can be produced. Here, the polymer material refers to a material having a large molecular weight, and refers to a polymer obtained by polymerizing a monomer, or a compound having a large molecular weight such as a natural polymer. Moreover, when using resin in an electrostatic capacitance type touch panel, it is preferable that an insulating resin with high dielectric constant is used.

An operation display panel of the present invention is any one of the display panels described above, in which the transparent conductive sheet is laminated on the back surface of the thin layer. Alternatively, an operation display panel of the present invention is any one of the display panels described above, in which a transparent conductive sheet is laminated on the exit surface or the incident surface of the light guide path-forming base material. In addition to transparent conductive sheet, it can function as an operation display panel and can be used as an operation input device by installing an infrared touch sensor attached around the thin layer, or by providing an optical sensor that can recognize the shape and movement of the user's hand gesture.

Effects of the Invention

According to the display panel and operation display panel of the present invention, there are effects such as reducing the thickness of the device, improving the visibility during light emission so as to be compatible with a higher definition display, and being able to manufacture at low cost.

Also, when the fluorescent sheet is arranged immediately below the thin layer, there is an effect that the characteristics of the fluorescent sheet can be changed according to the color of the thin layer. For example, by changing the composition of the fluorescent body contained in the fluorescent sheet, it is possible to change the wavelength distribution and color temperature of the white light generated by the blue LED and a yellow fluorescent body. For example, by changing the color temperature of the white light according to the color and material of the wood, it is possible to adjust the color that is transmitted through the surface material and finally reflected on the surface without changing the structure of the substrate. As a result, a variety of materials can be used for the thin layer, and a single substrate can be used to deal with point-by-point variations in the case of using natural materials, for example, and low cost can be achieved.

BEST MODE FOR CARRYING OUT THE INVENTION

Examples of the present invention will be described in detail below with reference to the drawings. The present invention is not limited to the following examples and examples shown in the figures, and the present invention can be variously changed in design.

First, before describing the examples of the present invention, the basic configuration of an operation display panel-incorporated article using a conventional operation display panel is described.

Figure 11:
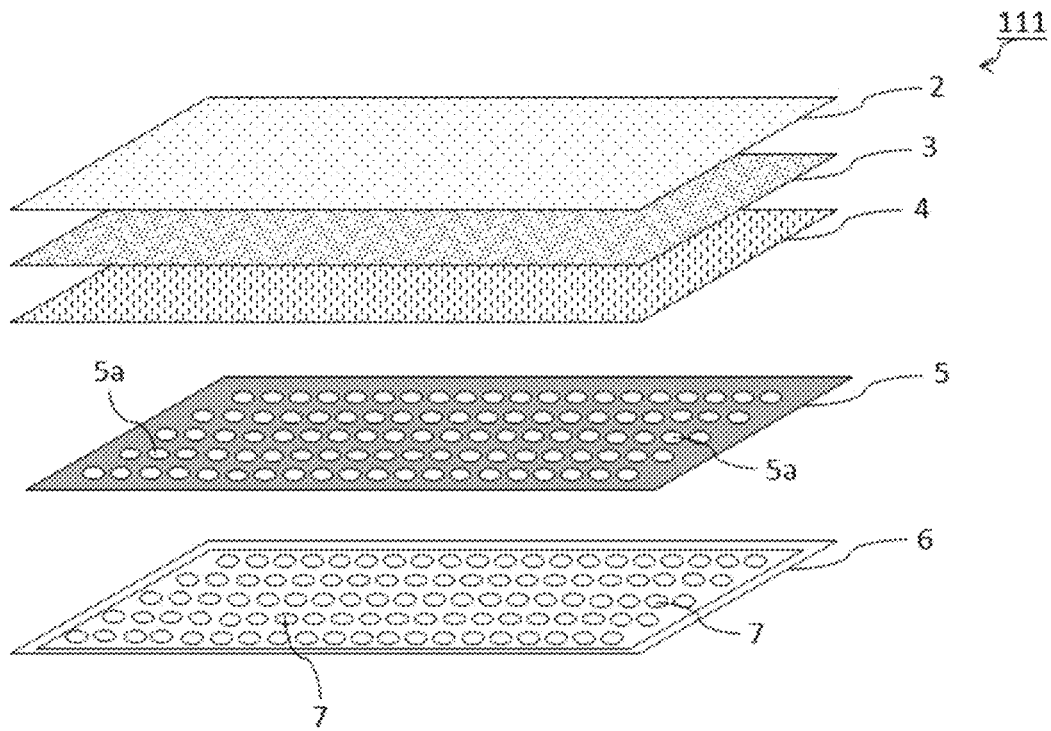
FIG. 11 shows a configuration image of a conventional operation display panel-incorporated article.

FIG. 11 shows a configuration image of a conventional operation display panel-incorporated article. As shown in FIG. 11, the operation display panel-incorporated article 111 is composed of a wood veneer 2, a transparent base 3, a transparent conductive sheet 4 as a transparent conductive film, a light guide 5 and a light emitting element array substrate 6 as a light emitting element array, which are laminated in order from the top. The veneer 2 made of Sycamore material is located on the outer surface of the operation display panel-incorporated article 111, and the light emitting element array substrate 6 is configured to be located inside the article. A large number of LED light sources 7 are two-dimensionally arranged in the light emitting element array substrate 6. The light guide 5 guides the light emission direction of each LED light source 7 in the direction perpendicular to the substrate of the light emitting element array substrate 6, and is provided guide holes 5a in the same number as the number of LED light sources 7.

In FIG. 11, for convenience of explanation, although not all LED light sources are shown, the light emitting element array substrate 6 is configured of, for example, a total of 6400 LED light sources with 32 vertical by 200 horizontal. One LED light source is composed of planar mounting type LEDs. A point light source is realized by the light of one LED light source, and this can be regarded as one dot, and one character or pattern can be represented by 8×8 dots or 16×16 dots. For example, in the case of the light emitting element array substrate 6 having 6400 LED light sources, a 22-character by 3-line sentence can be expressed. Here, as the LED light source, for example, one with a size of 2 mm×2 mm and 700 to 1000 mcd (Millicandela) is used.

The light guide 5 is a dark-colored base material, and plays a role of making a character or a pattern formed of light emitted from the LED light source 7 clearly visible through the plate 2. Namely, when the light guides 5 are stacked on the light emitting element array substrate 6, a large number of guide holes 5a are arranged in accordance with the arrangement of the LED light sources 7 so that the guide holes 5a are arranged right above each respective LED light source 7.

Figure 12:
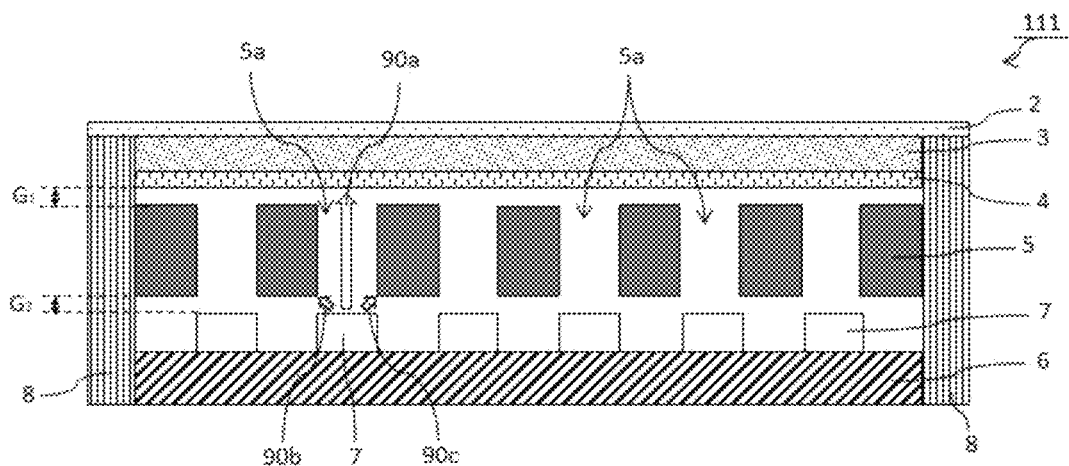
FIG. 12 shows a schematic cross-sectional view of a conventional operation display panel-incorporated article.

Next, the structure after assembly of the operation display panel-incorporated article using conventional display panel is described by referring to FIG. 12.

FIG. 12 shows a schematic cross-sectional view of the conventional operation display panel-incorporated article. As shown in FIG. 12, in the operation display panel-incorporated article 111, the wood veneer 2, the transparent base 3, the transparent conductive sheet 4, the light guide 5 and the light emitting element array substrate 6 are stacked in order from the top and adhered to the housing 8. Out of the light emitted from the LED light source 7 disposed on the light emitting element array substrate 6, the obliquely emitted light (90b, 90c) is blocked by the light guide 5, and the emitted light reaches the wood veneer 2 as a straight light like 90a. Note that the housing 8 is mainly made of ABS resin.

The wood veneer 2 and the transparent base 3, or the transparent base 3 and the transparent conductive sheet 4 are bonded without providing a gap. On the other hand, a gap G1 is provided between the transparent conductive sheet 4 and the light guide 5. This is because the light guide 5 is provided with the guide holes 5a, and when the transparent conductive sheet 4 and the light guide 5 are bonded, a stress variation occurs when operating the touch panel, which becomes a cause of a malfunction.

Also, a gap G2 is provided between the light guide 5 and the LED light source 7. Since the number of LED light sources 7 provided in the light emitting element array substrate 6 and the number of guide holes 5a provided in the light guides 5 are several thousands, when the light guides 5 and the light emitting element array substrate 6 are stacked, there is a possibility that an arrangement error occurs. When the light guide 5 and the light emitting element array substrate 6 are bonded in a state where an error occurs, the light emitted from the LED light sources 7 does not pass through the guide holes 5a and an accurate display cannot be performed. Therefore, by providing the gap G2, it is possible to prevent deterioration of display quality caused by an error in the arrangement of the LED light sources 7 and the guide holes 5a. Also, since the display quality can be maintained even if there are some errors, the manufacture becomes easy.

A display panel or operation display panel of the present invention is described below. It should be noted that the display panel or operation display panel described in the following examples can be incorporated in the housing 8 as shown in FIG. 12.

Example 1

Figure 1:
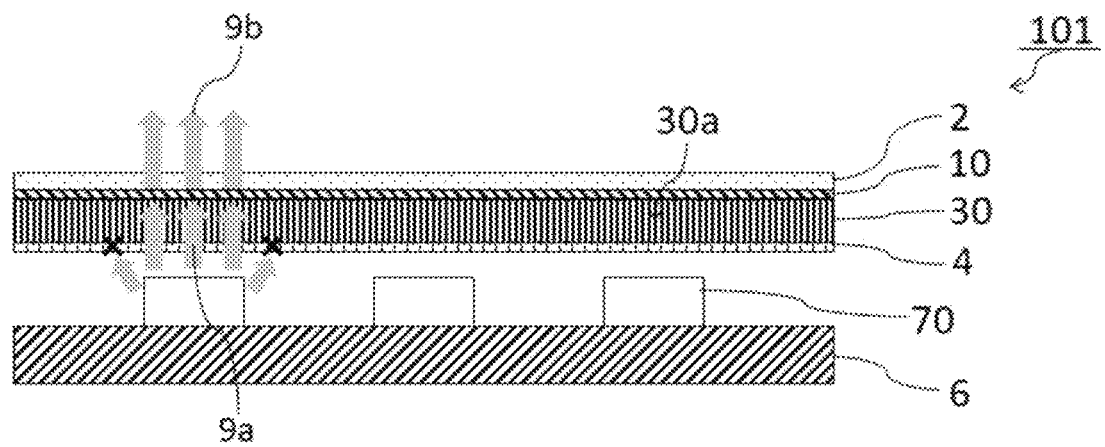
FIG. 1 shows a schematic cross-sectional view of the operation display panel of Example 1.

FIG. 1 shows a schematic cross-sectional view of the operation display panel of Example 1. As shown in FIG. 1, in the operation display panel 101, unlike the conventional operation display panel-incorporated article 111, instead of the transparent base 3, the light guide path-forming base material 30 forming light guide paths in the optical axis direction of the light emitting elements is provided.

The light emitting element 70 contains no fluorescent body and does not need to be molded with the fluorescent resin, so that the light emitting element can be miniaturized. The fluorescent sheet 10 is provided between the wood veneer 2 and the light guide path-forming base material 30 instead of the fluorescent body being contained in the light emitting element 70. Using the fluorescent sheet 10 in this way eliminates the need to align the light emitting element and the fluorescent body, and enables low-cost production. In this specification, the light emitting elements 70 are blue LEDs, and the fluorescent sheet 10 is composed of the complementary yellow fluorescent body, but other configurations may be used. For example, the fluorescent sheet 10 may be composed of yellow fluorescent bodies and red fluorescent bodies, or green fluorescent bodies and red fluorescent bodies.

The light guide path-forming base material 30 is the resin base material made of the transparent resin, and a large number of fine holes are formed as guide holes 30a in the optical axis direction of the light emitting element. Although not shown, the guide hole 30a is formed by a grid-shaped louver, and the gaps between the grid-shaped louvers serve as light guide paths along the optical axis of the light emitting element 70. Alternatively, the guide hole 30a serves as a light guide path for the light emitted from the light emitting element 70 by filling the guide hole 30a with the translucent material having a refractive index different from that of the main body of the light guide path-foiling base material 30. That is, the light 9a emitted from the light emitting element 70 passes through the guide hole 30a, so that the light emitted from the light emitting element 70 can efficiently propagate straight. This reduces the loss of light, increases the amount of light when displaying in a thin layer, and improves the display performance. Also, by adopting a configuration in which the light guide 5 is not provided, cost reduction and thickness reduction can be achieved.

The light 9a emitted from the light emitting element 70 passes through the guide hole 30a and then through the fluorescent sheet 10, so that the light 9a reaches the wood veneer 2 with its emission color adjusted. In this way, the light emitted from the light emitting element 70 is transmitted through the light guide path-forming base material 30 and the fluorescent sheet 10 in this order. As a result, the light from the light emitting elements can be transmitted through the fluorescent sheet 10 after propagating straight through the light guide path-forming base material 30, and can be prevented from diffusing in the fluorescent body.

Since the fluorescent sheet 10 is provided with a small thickness, scattering of light within the fluorescent body is suppressed, and blurring of light displayed on the surface material is reduced.

Also, although the light 9b has a structure in which it is difficult for the fluorescent sheet 10 to bleed, the light 9b is diffused by the wood veneer 2, so that the viewing angle is widened. Therefore, it is possible to obtain a configuration in which a wide viewing angle is obtained while increasing the amount of light, and the visibility at the time of light emission is improved. As described above, since the wood veneer 2 is made of sycamore material, it is possible to realize a clear display and a soft-looking display that gives the warmth of natural materials.

Example 2

Figure 2:
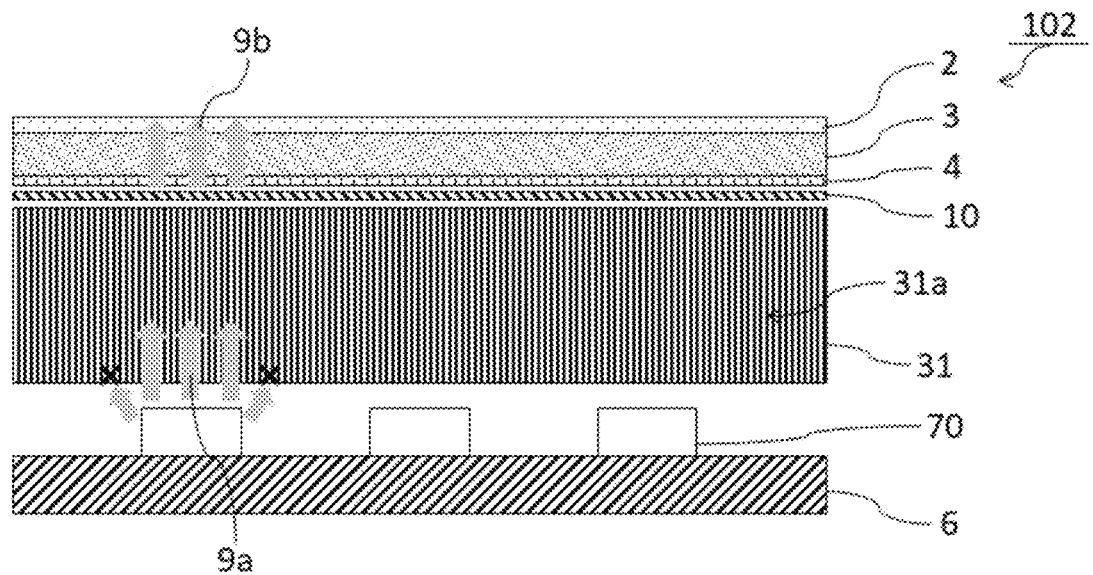
FIG. 2 shows a schematic cross-sectional view of the operation display panel of Example 2.

FIG. 2 shows an explanatory view of the operation display panel of Example 2. As shown in FIG. 2, unlike the prior art, the operation display panel 102 is provided with a light guide path-forming base material 31 as a light guide path-forming base material instead of the light guide 5. A large number of fine holes are formed as guide holes 31a in the main body of the light guide path-forming base material 31, which is a resin base material made of a transparent resin. Although not shown, the guide hole 31a is formed by the grid-shaped louver, and the gaps between the grid-shaped louvers serve as light guide paths along the optical axis of the light emitting element 70. Alternatively, the guide hole 31a serves as the light guide path for the light emitted from the light emitting element 70 by filling the guide hole 31a with the translucent material having the refractive index different from that of the main body of the light guide path-forming base material 31. The light guide path-forming base material 31 shown in FIG. 2 is thicker than the light guide path-forming base material 30 shown in FIG. 1, but the thickness of the light guide path-forming base material is not particularly limited. That is, various thicknesses can be adopted for the thickness of the light guide path-forming base material according to needs. For example, when the rigidity of the light guide path-forming base material 30 is desired to be increased, it can also be configured to have a greater thickness. Also, in order to reduce the thickness of the device, the light guide path-forming base material 31 may be configured to be thinner.

The guide holes 31a serve as light guide paths along the optical axis of the light emitting elements 70 arranged on the light emitting element array substrate 6, so that the light 9a emitted from the light emitting elements 70 can efficiently propagate straight. The light that has propagated straight through the guide hole 31a is adjusted in emission color by the fluorescent sheet 10, becomes light 9b, and reaches the display surface. As a result, the loss of light is reduced, the amount of light displayed on the wood veneer 2 is increased, and the display performance can be improved.

Example 3

Figure 3:
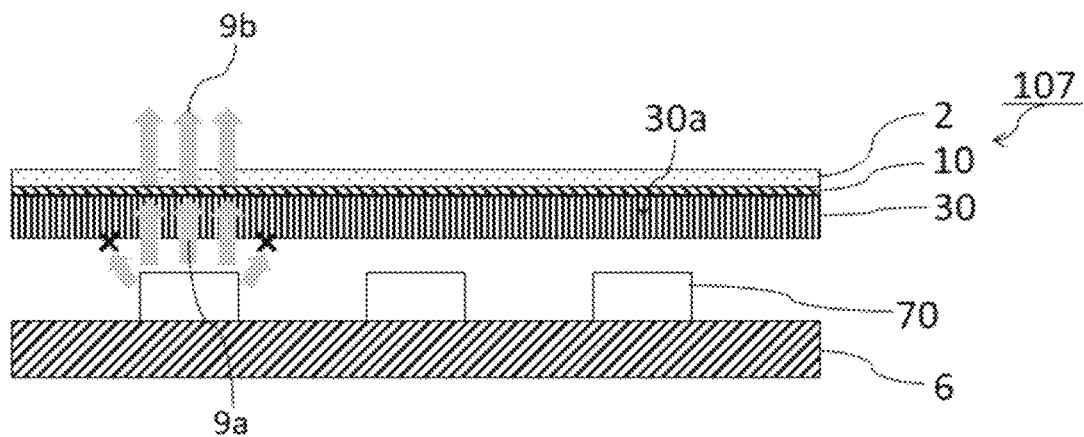
FIG. 3 shows a schematic cross-sectional view of the operation display panel of Example 3.

FIG. 3 shows an explanatory view of the display panel of Example 3. As shown in FIG. 3, unlike the operation display panel 101, the display panel 107 is not provided with the transparent conductive sheet 4. Other configurations are the same as those of the operation display panel 101.

Thus, even in a display panel in which the transparent conductive sheet 4 is not provided, by using the light emitting element 70 containing no fluorescent body in the light emitting element, the fluorescent sheet 10, and the light guide path-forming base material 30 in which a large number of fine holes are formed, it is possible to reduce the thickness of the device, further improve the visibility during light emission, and achieve a configuration that can be manufactured at low cost.

Example 4

Figure 4:
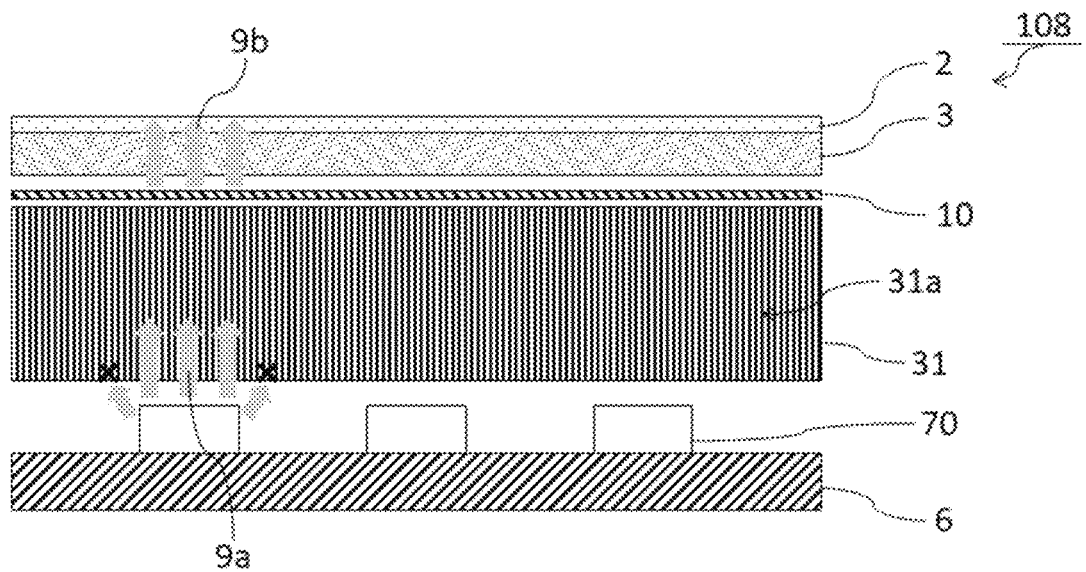
FIG. 4 shows a schematic cross-sectional view of the operation display panel of Example 4.

FIG. 4 shows a schematic cross-sectional view of the display panel of Example 4. As shown in FIG. 4, unlike the operation display panel 102, the display panel 108 is not provided with the transparent conductive sheet 4. Other configurations are the same as those of the operation display panel 102.

Thus, even in a display panel in which the transparent conductive sheet 4 is not provided, by using the light emitting element 70 containing no fluorescent body in the light emitting element, the fluorescent sheet 10, and the light guide path-forming base material 31 having a large number of fine holes, it is possible to reduce the thickness of the device, further improve the visibility during light emission, and achieve a configuration that can be manufactured at low cost.

Example 5

Figure 5:
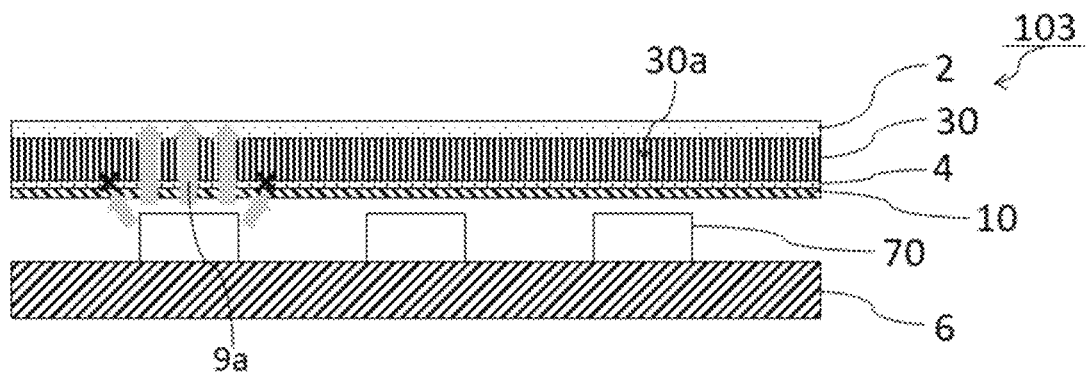
FIG. 5 shows a schematic cross-sectional view of the operation display panel of Example 5.

FIG. 5 shows a schematic cross-sectional view of the operation display panel of Example 5. As shown in FIG. 5, unlike the operation display panel 101, the operation display panel 103 is provided with the fluorescent sheet 10 between the transparent conductive sheet 4 and the light emitting elements 70. Other configurations are the same as those of the operation display panel 101.

As shown in FIG. 5, the light 9a emitted from the light emitting element 70 passes through the fluorescent sheet 10, in the state where the emission color is adjusted, passes through the guide hole 30a and reaches the wood veneer 2. As described above, even when the light emitted from the light emitting element 70 is transmitted through the fluorescent sheet 10 and the light guide path-forming base material 30 in this order, the effect of further improving the visibility during light emission can be obtained to some extent. Also, although the arrangement of each member is different from that of the operation display panel 101, the members used are the same. Therefore, it is possible to manufacture the device at a low cost while achieving the thinning of the device.

Example 6

Figure 6:
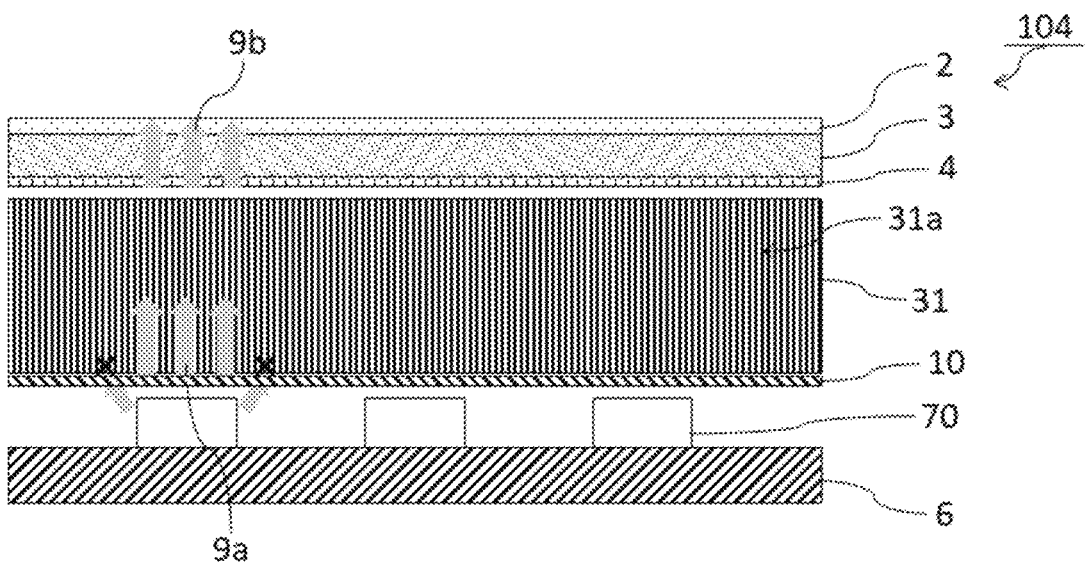
FIG. 6 shows a schematic cross-sectional view of the operation display panel of Example 6.

FIG. 6 shows a schematic cross-sectional view of the operation display panel of Example 6. As shown in FIG. 6, unlike the operation display panel 102, the operation display panel 104 is provided with the fluorescent sheet 10 between the light guide path-forming base material 31 and the light emitting elements 70. Other configurations are the same as those of the operation display panel 102.

As shown in FIG. 6, the light 9a emitted from the light emitting element 70 passes through the fluorescent sheet 10, in the state where the emission color is adjusted, passes through the guide hole 31a and reaches the wood veneer 2. As described above, even when the light emitted from the light emitting element 70 is transmitted through the fluorescent sheet 10 and the light guide path-forming base material 31 in this order, the effect of further improving the visibility during light emission can be obtained to some extent. Also, although the arrangement of each member is different from that of the operation display panel 102, the members used are the same. Therefore, it is possible to manufacture the device at a low cost while achieving the thinning of the device.

Example 7

Figure 7:
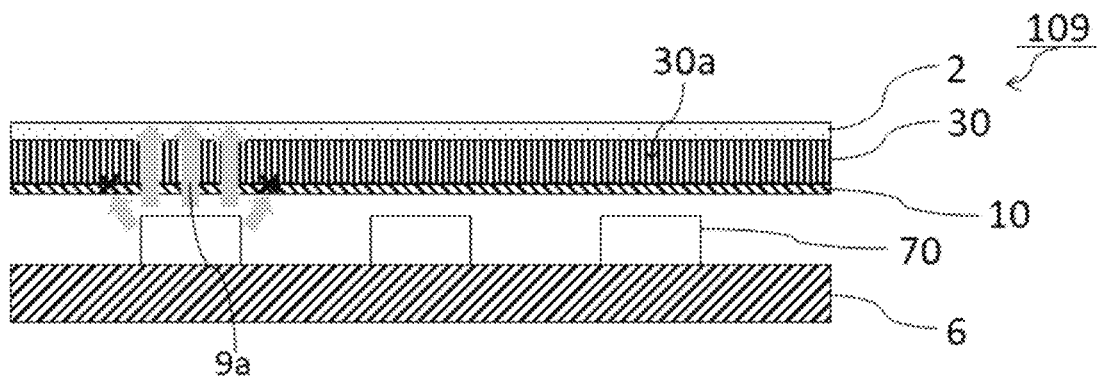
FIG. 7 shows a schematic cross-sectional view of the operation display panel of Example 7.

FIG. 7 shows a schematic cross-sectional view of the display panel of Example 7. As shown in FIG. 7, unlike the operation display panel 101, the display panel 109 is not provided with the transparent conductive sheet 4. Also, the fluorescent sheet 10 is provided between the light guide path-forming base material 30 and the light emitting element 70. Other configurations are the same as those of the operation display panel 101.

As shown in FIG. 7, the light 9a emitted from the light emitting element 70 passes through the fluorescent sheet 10, in the state where the emission color is adjusted, passes through the guide hole 30a and reaches the wood veneer 2. As described above, even when the light emitted from the light emitting element 70 is transmitted through the fluorescent sheet 10 and the light guide path-forming base material 30 in this order, the effect of further improving the visibility during light emission can be obtained to some extent. Also, it is the same as the operation display panel 103 except that the transparent conductive sheet 4 is not provided, and it is possible to manufacture the device at low cost while reducing the thickness of the device.

Example 8

Figure 8:
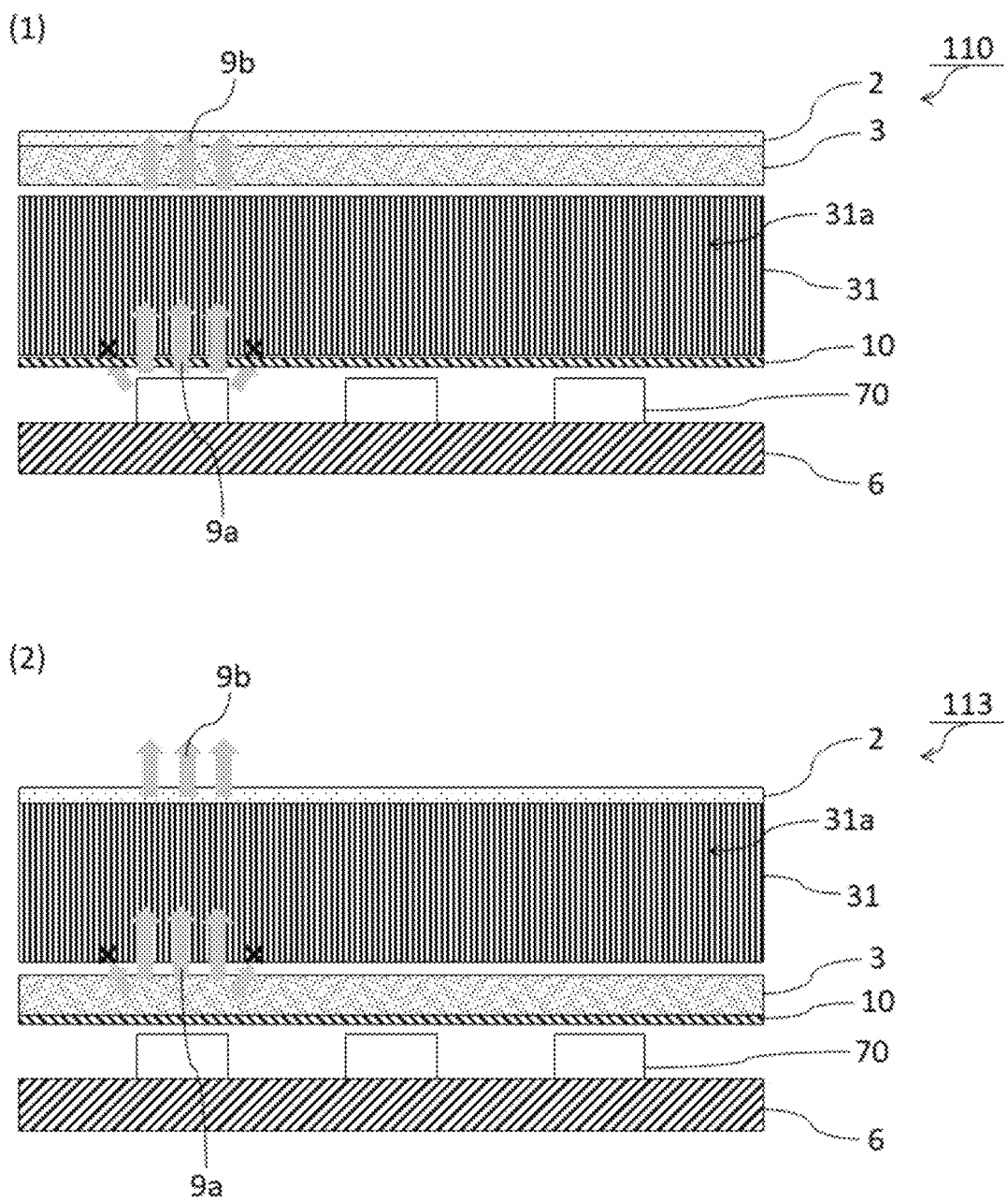
FIG. 8 shows a schematic cross-sectional view of the operation display panel of Example 8.

FIG. 8 shows a schematic cross-sectional view of the operation display panel of Example 8. As shown in FIG. 8(1), unlike the operation display panel 102, the display panel 110 is not provided with the transparent conductive sheet 4. Also, the fluorescent sheet 10 is provided between the light guide path-forming base material 31 and the light emitting element 70. Other configurations are the same as those of the operation display panel 102.

As shown in FIG. 8(1), the light 9a emitted from the light emitting element 70 passes through the fluorescent sheet 10, in the state where the emission color is adjusted, passes through the guide hole 31a and reaches the wood veneer 2. As described above, even when the light emitted from the light emitting element 70 is transmitted through the fluorescent sheet 10 and the light guide path-forming base material 31 in this order, the effect of further improving the visibility during light emission can be obtained to some extent. Also, it is the same as the operation display panel 104 except that the transparent conductive sheet 4 is not provided, and it is possible to manufacture the device at low cost while reducing the thickness of the device. Regarding the order of lamination of the transparent base 3 and the light guide path-forming base material 31, as shown in FIG. 8(2), the light guide path-forming base material 31 may be arranged immediately behind the wood veneer 2, and the transparent base 3 may be arranged thereunder.

Example 9

Figure 9:
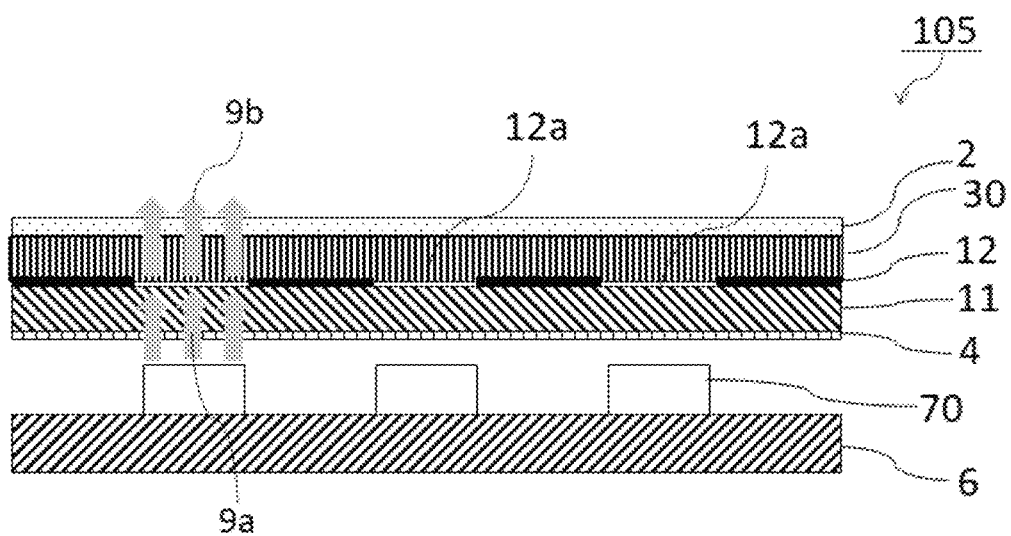
FIG. 9 shows a schematic cross-sectional view of the operation display panel of Example 9.

FIG. 9 shows a schematic cross-sectional view of the operation display panel of Example 9. As shown in FIG. 9, the operation display panel 105 is provided with the fluorescent resin base material 11 that is thicker and more rigid than the fluorescent sheet 10 instead of the fluorescent sheet 10. The fluorescent resin base material 11 is obtained by kneading fluorescent bodies into a resin material. Also, the light guide path-forming base material 30 and the opaque mask 12 are provided between the wood veneer 2 and the fluorescent resin base material 11. The opaque mask 12 has through-holes 12a arranged at the same pitch in accordance with the arrangement pattern of the light emitting elements 70, and has a function of guiding the light emission direction of the light emitting elements 70. By providing the opaque mask 12, it is possible to prevent the display from becoming unclear on the panel surface. Other configurations are the same as those of the operation display panel 101.

Example 10

Figure 10:
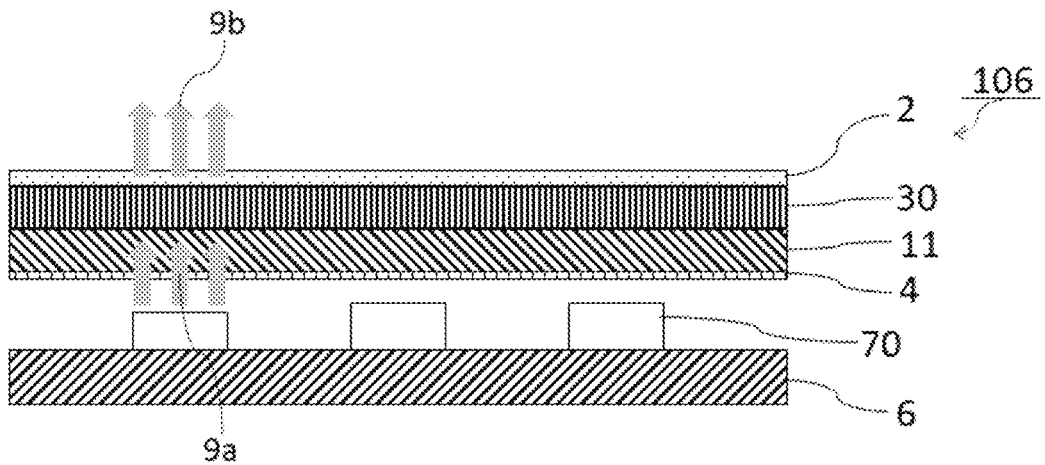
FIG. 10 shows a schematic cross-sectional view of the operation display panel of Example 10.

FIG. 10 shows a schematic cross-sectional view of the operation display panel of Example 10. As shown in FIG. 10, unlike the operation display panel 105, the operation display panel 106 is not provided with the opaque mask 12.

The opaque mask 12 in the operation display panel 105 has through-holes 12a arranged at the same pitch in accordance with the arrangement pattern of the light emitting elements 70, and has a function of guiding the light emission direction of the light emitting elements 70. However, when the operation display panel 105 is manufactured, it is necessary to align the light emitting element 70 and the opaque mask 12.

On the other hand, in the present example, since the opaque mask 12 is not provided, alignment between the light emitting element 70 and the opaque mask 12 is not necessary, and the manufacturing can be performed at low cost. Also, since the opaque mask 12 is not provided, it is possible to further reduce the thickness of the device.

Example 11

The operation display panels (101 to 106) or the display panels (107 to 110) described with reference to FIGS. 1 to 10 may further be provided with a condenser lens. The condenser lens here may be a lens array in which lenses are two-dimensionally arranged according to the pitch of the light emitting elements, or a lens array in which lenses larger or smaller than the diameter of the light emitting element are arranged two-dimensionally. Further, the condenser lens may be formed by laminating a resin having a different refractive index from that of the lens on the lens array, and faulting the upper and lower surfaces of the condenser lens substantially flat.

The type of lens may be a Fresnel lens having a light condensing function, or a collimator lens.

Regarding the arrangement of the condenser lens, it may be provided between any of the wood veneer 2, the light guide path-forming base material (30, 31), the transparent conductive sheet 4, the fluorescent sheet 10, the fluorescent resin base material 11, and the light emitting element 70.

Example 12

Figure 13:
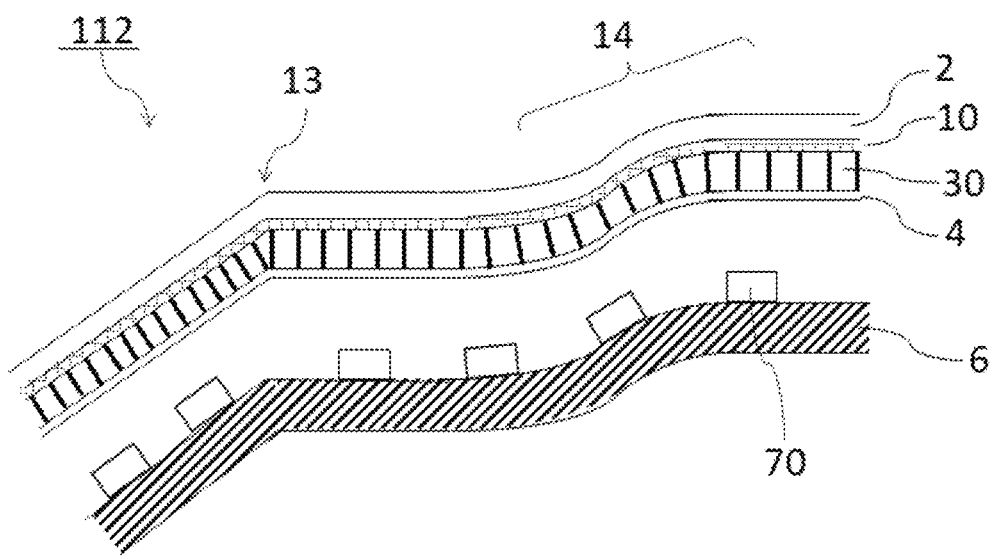
FIG. 13 shows a schematic cross-sectional view of the operation display panel of Example 12.

FIG. 13 shows a schematic cross-sectional view of the operation display panel of Example 12. As shown in FIG. 13, similar to the operation display panel 101, the operation display panel 112 is provided with the wood veneer 2, the fluorescent sheet 10, the light guide path-foiling base material 30, the transparent conductive sheet 4, and the light emitting element array substrate 6. The light emitting elements 70 are arranged on the light emitting element array substrate 6.

The phosphor sheet 10, the light guide path-forming base material 30, and the light emitting element array substrate 6 are made of flexible resin. The wood veneer 2 and the transparent conductive sheet 4 are also made of flexible materials. Therefore, unlike the operation display panel 101 that is formed in a flat shape as a whole, the operation display panel 112 has a shape that is bent at the bent portion 13 and curved at the curved portion 14.

In this way, by forming the members constituting the operation display panel and the display panel from flexible materials, it is possible to manufacture the operation display panel or the display panel with various designs.

In addition to using flexible materials, it is also possible to manufacture operation display panels or display panels having various shapes by molding the material into a non-flat shape during molding.

Example 13

Figure 14:
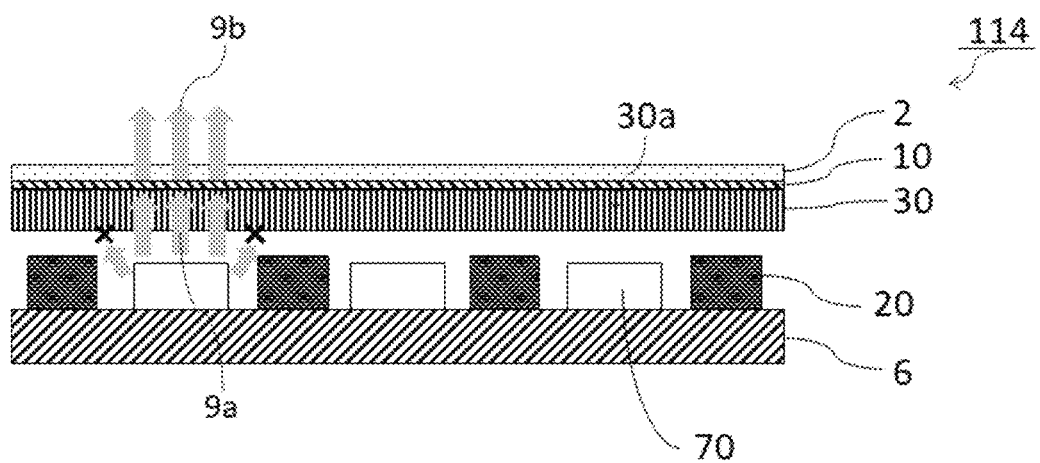
FIG. 14 shows a schematic cross-sectional view of the operation display panel of Example 13.

FIG. 14 shows a schematic cross-sectional view of the operation display panel of Example 13.

Unlike the display panel 107 shown in Example 3, the display panel 114 is provided with screen-like walls 20 between the light emitting elements 70 on the light emitting element array substrate 6. The screen-like wall portion 20 is formed by printing on the light emitting element array substrate 6. By providing the screen-like wall portion 20 higher than the height of the light emitting element 70, it is possible to prevent the light 9a emitted from the light emitting element 70 from leaking in the lateral direction, thereby preventing deterioration in display performance. By downsizing the size of the light emitting elements 70 from the order of millimeters to the order of microns, what is printed and formed on the light emitting element array substrate 6 functions as a screen-like wall portion higher than the height of the light emitting elements 70.

Similarly, in the other Examples 1, 2, 6 to 12, the display performance can be further improved by providing the screen-like walls 20 between the light emitting elements 70 on the light emitting element array substrate 6.

In addition, an aggregate of the screen-like wall portions 20 surrounding the light emitting elements 70 may be positioned as the light guide path forming base material 30 as shown in FIG. 14. That is, by downsizing the size of the light emitting element 70 from the order of millimeters to the order of microns, the adjacent screen-like wall portions 20 can function as the light guide path in the light guide path-forming base material 30 as shown in FIG. 14.

INDUSTRIAL APPLICABILITY

The present invention is useful as display panels used in display devices or operation display panels used in operation display devices mounted on controllers of home appliances, display of electronic devices, or movable bodies such as automobiles. It is also useful as display panels used in display devices or operation display panels used in operation display devices provided in structures such as interiors and exteriors of houses and buildings.

DESCRIPTION OF SYMBOLS

2 Wood Veneer
3 Transparent base
4 Transparent conductive sheet
5 Light guide
5a, 30a, 31a Guide hole
6 Light emitting element array substrate
7 LED light source
8 Housing
9a, 9b, 90a-90c Light
10 Fluorescent sheet
11 Fluorescent resin base material
12 Opaque mask
12a Through-hole
13 Bend portion
14 Curved portion
20 Screen-like wall portion
30, 31 Light guide path-forming base material
70 Light emitting element
101-106, 112 Operation display panel
107-110, 113, 114 Display panel
111 Operation display panel-incorporated article
G Gap

The invention claimed is:

1. A display panel comprising:
a light emitting element array substrate in which light emitting elements containing no fluorescent body are two-dimensionally arranged;
a fluorescent sheet or fluorescent resin base material;
a light guide path-forming base material that forms a light guide path in an optical axis direction of the light emitting element and has light directivity; and
a light diffusing opaque thin layer that covers an exit surface side; and
wherein the light emitting element array substrate, the fluorescent sheet or the fluorescent resin base material, the light guide path-forming base material, and the thin layer are laminated in this order, or
wherein the light emitting element array substrate, the light guide path-forming base material, the fluorescent sheet or the fluorescent resin base material, and the thin layer are laminated in this order.

2. The display panel according to claim 1, wherein the transparent base is laminated between the thin layer and the light guide path-forming base material or between the light guide path-forming base material and the light emitting element array substrate.

3. The display panel according to claim 1, wherein the fluorescent color of the fluorescent sheet or fluorescent resin base material is complementary to the color of light emitted by the light emitting element.

4. The display panel according to claim 1, further comprising a screen-like wall portion higher than the height of the light emitting elements being provided between the light emitting elements on the light emitting element array substrate.

5. The display panel according to claim 1, wherein the light guide path-forming base material is a resin or metal base provided with fine holes formed by grid-shaped louvers, and the gaps between the grid-shaped louvers serve as light guide paths along the optical axes of the light emitting elements arranged on the light emitting element array substrate.

6. The display panel according to claim 1, wherein the light guide path-forming base material is a resin base made of a transparent resin provided with fine holes, and the fine holes are filled with a translucent material having a refractive index different from that of the resin base.

7. The display panel according to claim 1, wherein the light guide path-forming base material is formed by laminating at least two louver films so that the louvers are perpendicular to each other.

8. The display panel according to claim 1, wherein the light guide path-forming base material is composed of an aggregate of fine fibers.

9. The display panel according to claim 1, wherein the light guide path-forming base material is an aggregate of screen-like wall portions surrounding the light emitting elements of the light emitting element array substrate, and wherein the height of the screen-like wall portion is higher than the height of the light emitting element.

10. The display panel according to claim 1, wherein the screen-like wall portion is formed by printing on the light emitting element array substrate.

11. The display panel according to claim 1, wherein the fluorescent resin base material is a base material formed by kneading fluorescent body into a resin.

12. The display panel according to claim 1, wherein the thin layer is made of a wood derived from nature, a natural fiber, a natural leather, or a natural stone.

13. The display panel according to claim 1, wherein the thin layer is made of a resin produced to mimic the appearance and touch of a wood derived from nature, a synthetic fiber produced to mimic the appearance and touch of a natural fiber, a synthetic leather produced to mimic the appearance and touch of a natural leather, or an artificial stone produced to mimic the appearance and touch of a natural stone.

14. The display panel according to claim 1, configured as an operation display panel characterized by the transparent conductive sheet laminated on the back surface of the thin layer in the display panel.

15. The display panel according to claim 1, configured as an operation display panel characterized in that the transparent conductive sheet is laminated on the exit surface or the entrance surface of the light guide path-forming base material in the display panel.

16. The display panel according to claim 1, being composed of yellow fluorescent bodies and red fluorescent bodies, or green fluorescent bodies and red fluorescent bodies.

17. The display panel according to claim 1, configured as an operation display panel characterized in that the transparent base is laminated between the thin layer and the light guide path-forming base material or between the light guide path-forming base material and the light emitting element array substrate, and the transparent conductive sheet is laminated on the incident surface of the transparent base in the display panel.

18. The display panel according to claim 1, configured as an operation display panel characterized by providing an optical sensor that can recognize the shape and movement of the user's hand gesture in the display panel.

19. The display panel according to claim 1, wherein the light guide path-forming base material is made of flexible resin.

20. The display panel according to claim 1, wherein the light emitting element array substrate is made of flexible resin or is non-planar.

* * * * *